United States Patent
Kolbenschlag (10) Patent No.: US 12,345,356 B2
(45) Date of Patent: Jul. 1, 2025

(54) CONTROL VALVE UNIT

(71) Applicant: SAMSON AKTIENGESELLSCHAFT, Frankfurt am Main (DE)

(72) Inventor: Stefan Kolbenschlag, Darmstadt (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 0 days.

(21) Appl. No.: 18/688,744

(22) PCT Filed: Aug. 26, 2022

(86) PCT No.: PCT/EP2022/073832
§ 371 (c)(1),
(2) Date: Mar. 1, 2024

(87) PCT Pub. No.: WO2023/031055
PCT Pub. Date: Mar. 9, 2023

(65) Prior Publication Data
US 2024/0288073 A1    Aug. 29, 2024

(30) Foreign Application Priority Data
Sep. 1, 2021   (DE) ............... 20 2021 104 689.9

(51) Int. Cl.
*F16K 41/02*  (2006.01)
*F16J 15/18*  (2006.01)
(Continued)

(52) U.S. Cl.
CPC ............ *F16K 41/02* (2013.01); *F16J 15/186* (2013.01); *F16K 37/0033* (2013.01); *F16K 27/00* (2013.01)

(58) Field of Classification Search
CPC ...... F16K 41/02; F16K 37/0033; F16K 27/00; F16J 15/186
(Continued)

(56) References Cited

U.S. PATENT DOCUMENTS

| | | |
|---|---|---|
| 3,968,970 A | 7/1976 | Vogeli |
| 5,290,010 A | 3/1994 | Ridge |

(Continued)

FOREIGN PATENT DOCUMENTS

| | | |
|---|---|---|
| DE | 4436744 C1 | 5/1996 |
| DE | 102006022212 A1 | 11/2007 |

(Continued)

OTHER PUBLICATIONS

German Search Report dated Aug. 30, 20212in the counterpart German application DE20 2021 104 689.9, 3 pages in German.

(Continued)

*Primary Examiner* — John Bastianelli
(74) *Attorney, Agent, or Firm* — Juan Carlos A. Marquez; Marquez IP Law Office, PLLC (57) ABSTRACT

A control valve unit includes a valve rod sealed from a valve housing via a seal assembly. The seal assembly has a packing, received axially between a pressure sleeve and a counter bearing on the valve housing. The pressure sleeve is movably and axially mounted via a pressing element relative to the valve housing and transmits a pressing force to the pressure sleeve by a spring element to the packing. The spring element is supported on a pretensioning device with an adjustable distance to the counter bearing. The pressing force of the spring element on the pressure sleeve is adjustable and the spring element is arranged axially between first and second stops of the pretensioning device. In a preinstalled state of the pretensioning device, the spring element is supported on the first and second stops. In an operating (Continued)

state, the second stop is at a fixed distance to the first stop in the direction of the counter bearing. The change in the axial position of the pressure sleeve is limited by the second stop and at a distance to the pressure element in the direction of the counter bearing.

11 Claims, 3 Drawing Sheets

(51) Int. Cl.
  *F16K 37/00* (2006.01)
  *F16K 27/00* (2006.01)
(58) Field of Classification Search
  USPC ..................................................... 251/214
  See application file for complete search history.

(56) References Cited

U.S. PATENT DOCUMENTS

| | | | |
|---|---|---|---|
| 5,456,447 A * | 10/1995 | Reynolds | ............... F16K 41/02 |
| | | | 137/315.28 |
| 5,549,305 A | 8/1996 | Freund | |
| 7,753,339 B2 * | 7/2010 | Yuzawa | ................. F16K 41/02 |
| | | | 251/214 |
| 8,613,423 B2 * | 12/2013 | Hutchens | ............... F16K 41/02 |
| | | | 137/315.28 |
| 2015/0369388 A1 | 12/2015 | Fan | |

FOREIGN PATENT DOCUMENTS

| | | |
|---|---|---|
| DE | 102014015888 A | 4/2016 |
| EP | 2753908 B1 | 7/2014 |

OTHER PUBLICATIONS

PCT International Search Report and Written Opinion dated Dec. 7, 2022, in the counterpart PCT application PCT/EP2022/073832, 13 pages in German.
PCT International Search Report dated Dec. 7, 2022, in the counterpart PCT application PCT/EP2022/073832, 2 pages in English.
PCT International Preliminary Report on Patentability and Written Opinion dated Mar. 5, 2024, in the counterpart PCT application PCT/EP2022/073832, 8 pages in English.

\* cited by examiner

CONTROL VALVE UNIT

This application is a national stage application filed under 35 U.S.C 371 of International Application No. PCT Application No. PCT/EP2022/073832 filed Aug. 26, 2022, which claims priority to German Patent Application No. 10 2021 104 689.9 filed Sep. 1, 2021. The disclosures of the above-referenced applications are incorporated herein by reference in their entireties.

The invention relates to a control valve unit as specified in the preamble of claim 1.

A control valve unit comprises a valve rod which is sealed from a valve housing via a seal assembly. The seal assembly comprises a sealing element in the form of a stuffing box, which contains a deformable packing material—also known as packing—and a pressure sleeve which axially compresses the sealing element and on which a contact pressure is exerted in particular via a spring element. Depending on the operating conditions, e.g. high temperatures, high pressure and/or aggressive media, the packing can be made of different components and/or materials, for example aramid, graphite, PTFE etc., with the addition of various lubricants and impregnating agents. There are a variety of materials available that have different settling characteristics. The axial pressure exerted also causes the sealing element to be pressed radially onto the valve rod and valve housing. However, these types of seal assembly have the disadvantage that they are subject to wear and settling characteristics during operation and become leaky over time when the contact pressure of the packing decreases. A pretensioned spring element can be used for automatic axial pretensioning of the packing.

It is desirable to detect a decrease in the tightness of the seal assembly at an early stage. U.S. Pat. No. 5,549,305, for example, discloses a soot blower which comprises a feed pipe for delivering liquid to a concentrically mounted lance pipe, with a seal assembly preventing the liquid from escaping from the system. The seal assembly has a packing between the inner surface of the lance tube and the outer surface of the feed tube. In order to maintain a sealing effect of the packing in the event of wear, a pressure sleeve in engagement with the packing is preloaded by a large number of coil springs. The coil springs are pretensioned between a fixed stop and a movable stop of a pretensioning device which is connected to the pressure sleeve. The desired contact pressure on the packing can be set via the number of springs. In one embodiment of the invention, elongation of the springs, which occurs as a result of the diminishing preload force, which in turn is due to wear of the packing, can be detected by means of a bolt that is screwed into the movable stop and extends through a sleeve attached to the fixed stop. The elongation of the springs increases the distance between the fixed stop and the movable stop, pulling the head of the bolt into the sleeve until it disappears. This is an indication or a signal that the springs need to be retensioned.

DE 10 2006 022 212 A1 discloses a spring arrangement of a seal assembly used to seal a valve rod from a valve body, for example. A packing of the seal assembly is compressed by means of a pressure sleeve which is acted upon by a pressure element in the form of a compression flange, with the pressure element cooperating with the spring arrangement. The spring arrangement is connected to the compression flange via a connecting element anchored in the valve body. The connecting element, designed as a threaded bolt, passes through the spring arrangement and the compression flange. A threaded nut which is screwed to the threaded bolt with the spring arrangement arranged in between, allows varying the pressure applied to the pressure sleeve and thus to the packing. The spring arrangement has a spring element that can be compressed via the threaded nut to provide the necessary degree of pretensioning, with the spring element being accommodated in a housing and held in the housing by a sealing cover. The sealing cover and the housing can perform a mutual relative movement in the axial direction while simultaneously compressing/releasing the spring element.

US 2015 0369 388 A1 discloses a valve configuration that has a seal assembly whose packing is compressed using a pressure sleeve that includes a pressure element in the form of a compression flange. The compression flange is connected to a valve body via connecting elements or bolts. The pressure on the packing can be increased by tightening the nuts screwed to the respective bolts, with a spring element being arranged between the nut and the bolt.

EP 2 753 908 B1 discloses a control valve unit having a seal assembly in which a packing is compressed by elongated bolts which have their one end connected to a valve housing and their respective other end to a compression flange. The compression flange is supported on a pressure sleeve of the seal assembly. Tightening nuts screwed to the bolts increases the pressure on the packing. A spring element is arranged between the nuts and an outer surface of the flange, which spring element compensates for changes in the packing in order to maintain the required pressure and the seal to the valve rod.

DE 10 2014 015 888 A1 discloses a control valve unit having the generic features. The control valve unit comprises a valve rod that is sealed from a valve housing via a seal assembly. The seal assembly has a compressible packing which is held axially between a counter bearing on the valve body and a pressure sleeve. The pressure sleeve is mounted so that it can move axially relative to the valve housing. A spring element transfers a contact pressure to the packing via the pressure sleeve. The spring element is supported against a pretensioning device, the distance of which to the counter bearing can be adjusted. This allows the contact pressure of the spring element acting on the pressure sleeve to be adjusted. A change in position of the pressure sleeve relative to the counter bearing can be detected via a measuring device.

This type of seal assembly is subject to wear and settlement during operation. This causes the axial pressure and the associated radial sealing forces on the valve rod and the valve housing to diminish over time, and there is a risk of process fluid escaping from the valve housing. In the event of wear and settlement of the packing, the packing can be automatically retensioned axially by means of the pretensioned spring element acting on the pressure sleeve. The forces of the spring element decrease with increasing elongation according to the spring characteristic.

It is the object of the invention to further develop a control valve unit of the type specified in claim 1 in such a way to enable improved adjustability of the tightness of a seal assembly with different packings compared to the state of the art.

This object is accomplished by the characterizing features of claim 1 in conjunction with the features of its preamble.

The dependent claims relate to an advantageous further development of the invention.

In a known manner, a control valve unit comprises a seal assembly that seals a valve rod from a valve housing. The seal assembly has a stuffing box in which an axially compressible packing is received between a counter bearing on the valve housing and a pressure sleeve movably mounted in the axial direction relative to the valve housing. Contact pressure is exerted on the pressure sleeve by at least one spring element, the one end of which is supported on a pretensioning device, and the other end of which is supported on the pressure sleeve. The spring element is supported on the pressure sleeve via a pressure element, for example an annular shoulder. The distance of the pretensioning device from the counter bearing can be adjusted, for example by means of adjusting screws, which allows the corresponding contact pressure of the spring element to be set. If the tightness of the packing decreases, contact pressure exerted by the spring element causes the pressure sleeve to move axially in the direction of the counter bearing, which relative movement is an indication that there is corresponding wear of the packing.

The valve housing can be designed in one piece, for example, in such a way that the housing for the packing, fluidic connections and a valve seat are accommodated in the one-piece valve housing. It is also possible for the valve housing to comprise a base housing, in which the valve seat and the fluidic connections are located, as well as a valve cover, which serves to receive the packing with the valve rod. The valve cover and the base housing are then connected in a sealed manner. The control valve unit and the fluidic connections can be designed for use with gases or liquids.

According to the invention, the spring element is arranged axially between a first stop and a second stop of the pretensioning device, wherein, in a preassembled state of the pretensioning device, the spring element is supported under pretension on the first stop and on the second stop, wherein, in an operating state of the control valve unit, the second stop is arranged at a fixed distance from the first stop in the direction of the counter bearing, and wherein the axial change in position of the pressure sleeve is limited by the second stop arranged at a distance from the pressure element in the direction of the counter bearing. In the pre-assembled state of the pretensioning device, the spring element extending in the axial direction, for example a disk spring assembly or a coil spring, is axially clamped between the first stop and the second stop, not exerting any contact pressure on either the compression sleeve or the packing in this state. The spring element can be mounted into the pretensioning device under pretension, and will generate a certain pretensioning force even when at rest, i.e. without exerting any contact pressure on the pressure sleeve. Consequently, the spring element can be installed in the control valve unit in a pretensioned state, i.e. already having a high spring force.

The second stop is arranged at a fixed distance from the first stop, i.e. an expansion between the first stop and the second stop is constant, and the spring element is installed in the pretensioning device in the control valve, with the installation space, which may in particular have a small axial expansion, remaining the same.

To achieve an operating state of the control valve unit, the pretensioning device is installed and the packing is braced. When mounting the pretensioning device in the control valve unit, the axial distance between the pretensioning device and the counter bearing is set, i.e. the first stop and the second stop move in an axial direction towards the counter bearing. The pressure element is arranged in a fixed position relative to the pressure sleeve. As a result, it remains in the same axial position. The second stop moves away from the pressure element in the direction of the counter bearing, so that the spring element is now supported on the pressure sleeve via the pressure element and braces the packing. An axial distance between the first stop and the pressure element is reduced. The spring element is compressed further between the first stop and the pressure element. This increases the pretensioning force of the spring element. In an advantageous manner, use of the pretensioning device according to the invention allows the spring element to be installed in the control valve unit with a high pretensioning force already, thus enabling the contact pressure of the spring element to be increased further as it is being installed in the control valve unit. This allows the pretensioning force of the spring element to be adjusted to suit the design conditions of the sealing packing. Depending on the composition of the packing, the pretensioning force should not be set too tightly, for example to minimize friction on the valve rod. However, it must be set high enough to ensure that radial sealing forces will prevent any process fluid from escaping.

As the pretensioning device is being installed, the second stop moves away from the pressure element in the direction of the counter bearing, and an axial distance between the second stop and the pressure element is increased. Due to the pretensioning energy, the spring element exerts a contact pressure on the pressure element and hence on the pressure sleeve when the pretensioning device is in place, in order to move these components in an axial direction towards the counter bearing in case of wear and/or setting of the packing. When the contact pressure decreases, the packing is automatically retensioned via the pretensioning force of the spring element until an axial change in position of the pressure sleeve or pressure element is stopped by the second stop. The second stop thus serves to limit the axial spring deflection and to limit the axial change in position of the pressure sleeve. This allows a sealing gap between the valve rod and the valve housing to be set to a minimum adapted to the operating conditions and, if the tightness of the packing decreases, it can be tightened in a controlled manner depending on the settling characteristics and the service life of the packing. When the spring element is deflected maximally up to the limiting second stop, either the spring element can be retensioned via the pretensioning device, or the exhausted packing can be replaced in order to prevent packing leakage due to a decrease in the tightness of the packing. In an advantageous way, limiting the change in position of the pressure sleeve allows the contact pressure of different packings to be adjusted well and packing leakage to be avoided at an early stage.

Preferably, the pressure element is designed as a compression flange. For example, the compression flange may be formed as a flat pressure plate. It is used to evenly distribute the contact pressure on the pressure sleeve and consequently on the packing. A crowned connecting surface between the pressure element and the pressure sleeve, which in particular has a crowned annular shoulder, can be used to transmit an effective force of the spring element in the event of asymmetry in the axial direction. The compression flange prevents the spring element from loading the compression sleeve non-symmetrically. The compression sleeve can be designed to have a projection, an annular shoulder or the like, for example, on which the compression flange is supported and which at least partially embraces the compression sleeve radially. It is also conceivable for the compression flange to be formed in one piece with the pressure sleeve. For example, a radial projection of the pressure sleeve can form the compression flange.

Preferably, the pretensioning device has a housing which comprises a control cover that forms the first stop and is connected to a control body that forms the second stop. The control cover ensures that the spring element is held captive in the actuator. The control cover and the actuator can be connected to each other in a sealing and detachable manner, for example via screw connections. The two-part design of the pretensioning device allows the spring element to be easily clamped between the first stop of the control cover and the second stop of the actuator body of the pretensioning device, especially when the installation space is small. In an advantageous way, it is possible to install the pretensioning device as a pre-assembled unit in the control valve unit, for example to reduce the amount of installation work required at the location of the control valve unit.

In a preferred embodiment of the invention, the actuator has an internal adjusting thread that engages with an external thread of the valve housing when the control valve unit is mounted. The actuator can be screwed into the valve housing using a torque wrench or a defined number of rotations of the actuator, for example 6 to 7 rotations. As a result, the pretensioning device, i.e. the first stop and the second stop, move in an axial direction towards the counter bearing. As a result, the second stop moves away from the pressure element, which is fixed in position relative to the pressure sleeve and on which the spring element is directly supported, and the spring element is compressed further between the first stop and the pressure element. A required predefined spring force, which the spring element should achieve for tensioning the packing, depends on the design or composition of the packing. Thus, the pretensioning device according to the invention, which is adjustable in its axial distance to the counter bearing via the adjusting thread, can be used to adjust a pretensioning force of the spring element according to the operating and/or design conditions of the packing.

Preferably, the pretensioning device is connected to a measuring device that comprises a measuring element for detecting the axial change in position of the pressure sleeve. The measuring device can, for example, be permanently connected to the pretensioning device, i.e. the measuring device can be pre-assembled together with the pretensioning device to form a single assembly. This helps to simplify installation of the control valve unit.

Alternatively, it is possible for the measuring device to be detachably connected to the pretensioning device. They can be screwed or clip-fitted together, for example. This has the advantage that the measuring device is only connected to the pretensioning device after the actuator and the valve housing have been screwed together, for example, which in particular prevents the wiring of the measuring device from being twisted.

The measuring device comprises a measuring element that detects the axial change in position of the pressure sleeve relative to the pretensioning device or to the second stop. In particular, such detection can be based on a non-contact mode of operation, for example inductive, capacitive or magnetic operation mode or the like. It is also conceivable for the measuring element to be designed as a switch that is actuated by an actuating means to cause it to detect the change in position of the pressure sleeve.

In a preferred embodiment of the invention, the measuring element is designed as a magnet-sensitive sensor that interacts with a magnet that is connected to the pressure sleeve. The sensor detects a relative change in position of the pressure sleeve via the magnet connected to the pressure sleeve without any contact or wear. Such a sensor can be used to allow both step-by-step and continuous position detection of the pressure sleeve. The magnetic sensor can, for example, be designed as an xMR chip or as a Hall effect sensor. Magnetic sensors are advantageously insensitive both to temperature fluctuations and to dust and moisture in harsh environments. They are highly accurate, reliable and robust.

Preferably, the measuring device has a sensor housing for accommodating the sensor, with a guide groove being formed in the sensor housing in which the magnet is guided so as to be movably in an axial direction, and in which the magnet is connected to the pressure sleeve via a magnetically conductive fastening ring which at least partially engages radially in the guide groove. The sensor is arranged in a fixed position on the sensor housing. The sensor housing enhances the robustness and durability of the measuring device when the latter is used in harsh outdoor applications and/or in difficult environments, as the sensor is mounted in a safe area.

The magnet is guided in the guide groove of the sensor housing so as to be axially movable therein and secured against falling out. The sensor housing has a recess extending along a longitudinal side arranged on the pressure sleeve, which forms the axial guide groove. The magnet and a boundary of the guide groove formed by the sensor housing have almost complementary shapes. As a result, the magnet is arranged in the guide groove, which extends in the axial direction, such that it is secured from falling out and virtually free of play. For example, the magnet may be cylindrical in an axial direction, with the boundary of the guide groove in cross-section at least partially encompassing a bolt circle, which forms the guide groove, beyond an equator. The sensor housing can form a crescent-shaped cross-sectional boundary of the guide groove, for example.

The magnet is connected to the pressure sleeve via a magnetically conductive fastening ring. At a free end of the pressure sleeve, the fastening ring is connected to the pressure sleeve via a mounting ring, for example. More specifically, the fastening ring is arranged on the end face of the pressure sleeve and engages radially around the valve rod. As a result, the axial change in position of the pressure sleeve causes an axial change in position of the magnet.

Viewed in an axial direction, the boundary of the guide groove formed by the sensor housing is arranged on the pressure sleeve without overlapping with the fastening ring. The fastening ring extends at least partially into the guide groove in a radial direction. This allows the pressure sleeve to entrain the magnet adhering to the fastening ring in an axial direction in the guide groove as it moves owing to wear of the packing.

The axial change in position of the pressure sleeve causes an axial change in position of the magnet relative to the sensor, which is arranged in a fixed position on the pretensioning device. The magnet is accommodated separately from the sensor in the sensor housing and always remains at a fixed radial distance relative to the sensor because of it being guided axially in the guide groove. This enables a reliable distance measurement of the measuring device in an axial direction. This ensures reliable detection of wear of the packing by means of the magnetic sensor.

The magnet is preferably arranged so that it can rotate relative to the fastening ring in the circumferential direction of the valve rod. The actuator of the pretensioning device, which is in particular designed to form an assembly with the measuring device, is screwed in opposite the valve housing to adjust the spring pretensioning force. This means that the pretensioning device is rotated several times around the axis together with the sensor housing via the actuator, in which process the sensor housing entrains the magnet on the fastening ring in its rotational movement in the circumferential direction of the valve rod. The guide groove of the sensor housing is arranged on the pressure sleeve in such a way that, as the pretensioning device rotates around its axis, the magnet is rotated around the valve rod while adhering to the fastening ring In a preferred embodiment of the invention, the measuring element communicates bidirectionally with an operating unit which is communicatively connected to an operating unit of the measuring device, which operating unit has at least one display unit and a calibration button. For instance, the operating unit can be designed as a mobile terminal device that communicates wirelessly with the control unit, for example.

The measuring element, which is designed in particular as a magnetic sensor, communicates with the control unit to process measurement data from the measuring element. For example, the sensor can be designed to have integrated microelectronics that process the measurement data in the sensor and, in particular, forward it to the display unit so that, for example, a user can read it. It is possible for the sensor and the control unit to be integrated on a single chip, for example. It is also conceivable for the sensor to be connected to an external control unit, i.e. the sensor and the control unit are formed separately.

The calibration button on the control unit is used to set the sensor very precisely to a zero position electronically. This allows the sensor to detect a movement of the magnet relative to the sensor. The control unit processes the sensor's measurement data with evaluation electronics and forwards position values of the pressure sleeve to the display unit. A position value of the pressure sleeve can now be read at any time during operation. This allows both a discrete position detection and a continuous position detection of the pressure sleeve over time. The user of the control valve unit can thus read the change in position of the pressure sleeve and conclude that there is wear of the packing. If the position value reaches a predefined threshold, for example, an alarm can be output to ensure that the packing is either retensioned or replaced.

In a preferred embodiment of the invention, the control unit detects the contact pressure of the package via a force-displacement characteristic of the spring element. The force-displacement characteristic of the spring element can be stored in a data memory of the control unit. The force-travel characteristic defines the relationship between spring force and spring travel and is an indication of the behavior of the spring element during operation. Depending on the design, the spring element behaves differently during operation. In particular, the spring element can be designed as a compact disk spring package, which is suitable for installation in limited installation spaces which nevertheless require high forces. Alternatively, it is also conceivable for the spring element to be designed as a helical compression spring. Based on the measured axial position change of the compression sleeve, the remaining pretensioning force of the spring element can be displayed over time via the force-displacement characteristic during operation. This thus also allows detection of the axial change in the force acting on the packing. In an advantageous way, it is possible, for example, to monitor the contact pressure via the display unit during installation and to retension the actuator accordingly.

In this way, the force-displacement characteristic together with the sensor can be used to precisely adjust the axial tensioning force of the spring element and thus achieve a contact force on the packing that is adapted to the operating conditions. Before installation in the control valve unit, the spring element in the pretensioning device is pretensioned to a specific contact pressure, with the sensor being calibrated as a force sensor. The pretensioning force of the spring element in the pre-assembled state of the pretensioning device can be displayed via the control unit, for example. The actuator is then screwed into the valve housing when the pretensioning device is installed in the control valve unit. The sensor can be zeroed at a specific screw-in point relative to the magnet, for example at the screw-in point at which the spring element rests against the pressure sleeve without any contact force, with the pressure element in between, and a contact force on the pressure sleeve is prevented by the second stop. At this screw-in point, the magnet is located in an area of an optimum lower range value of the sensor, for example at its lowest position relative to the sensor. When the pretensioning device is turned, the first stop, the second stop and the sensor, which is connected to the pretensioning device in a fixed position, move in the direction of the counter bearing. The sensor moves relative to the magnet, the second stop moves away from the pressure element, and the first stop presses the spring element against the pressure sleeve via the pressure element. This compresses the spring element even further. The pretensioning device can be rotated further into the valve housing up to a predefined sensor value, which corresponds to a specific pretensioning force of the spring element, in order to achieve a desired, predefined axial contact pressure against the packing. The contact pressure acting on the packing can be continuously displayed on the control unit as the pretensioning device is being installed and when the control valve unit is in operating mode. The pretensioning device according to the invention can be easily adjusted to the operating conditions of packings manufactured in different ways and having different lengths. Furthermore, during the retightening process of the spring element, the contact force on the package can be monitored via the display unit and the actuator can be retightened according to the contact force being displayed.

Preferably, the control unit is communicatively connected to at least one actor, which is connected to the actuator for adjusting the pretensioning force. The actor converts data received from the control unit into a mechanical movement. In other words, the actor causes the actuator to rotate in order to adjust the contact pressure acting on the packing. This can take place, for example, when a preset threshold of the change in position of the compression sleeve and/or pretensioning force of the spring element is reached. In an advantageous way, the pretensioning force of the spring element is adjusted automatically by readjusting the pretensioning device or tightening the actuator by means of an actor.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below. In the drawings.

Figure 1:
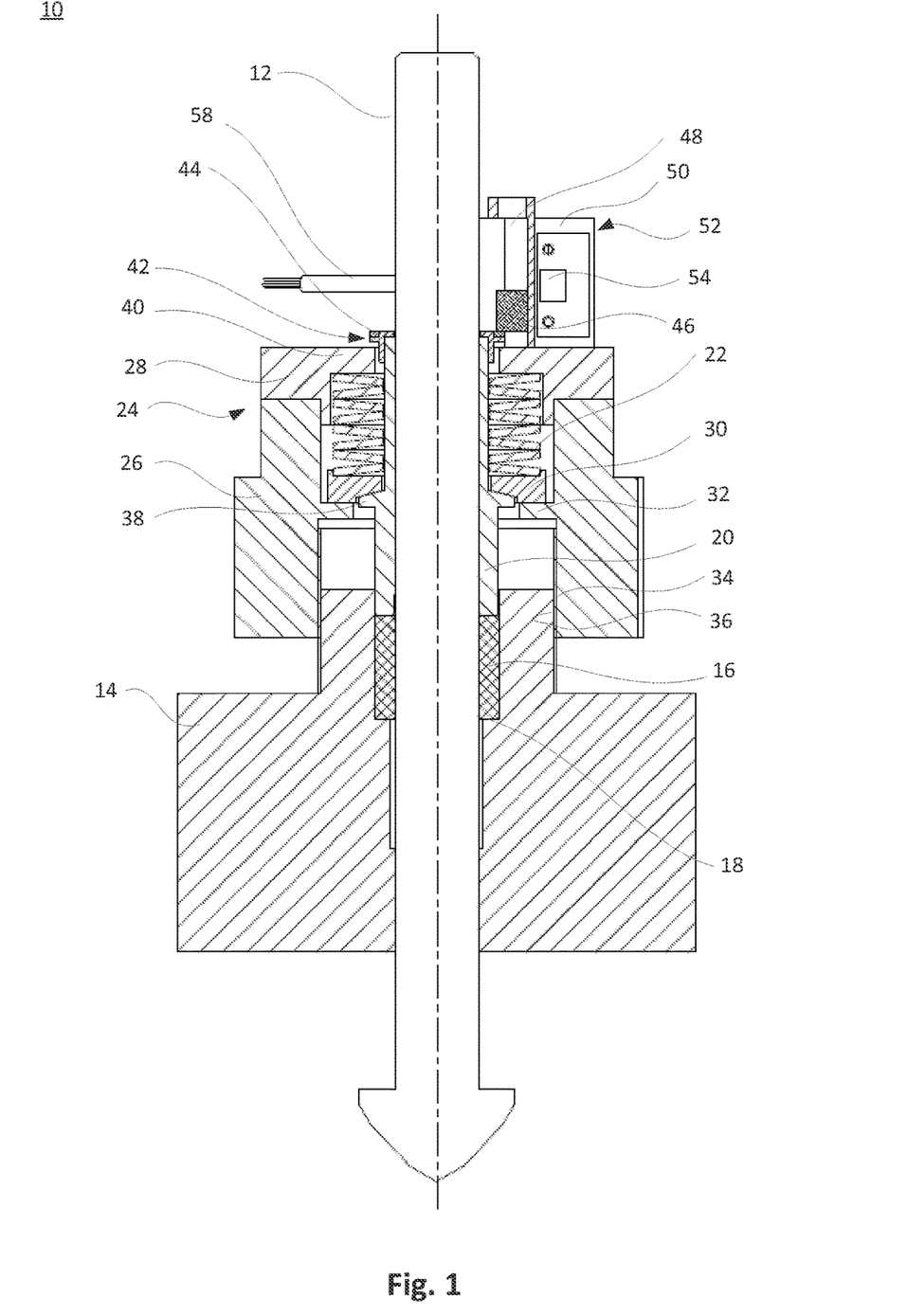
FIG. 1 is a detail of a sectional view of a control valve unit according to the invention with a pretensioning device, in a preassembled state.

FIG. 1 is a view of a detail of a control valve unit 10, which has a valve rod 12 and a valve housing 14. The valve rod 12 is sealed against the valve housing 14 by a seal assembly comprising a packing 16.

The packing 16 is arranged in an axial direction between a counter bearing 18 and a pressure sleeve 20. The pressure sleeve 20 is mounted for axial displacement relative to the valve housing 14, which counter bearing 18 may be a component of the valve housing 14 or may be permanently arranged in the valve housing 14. The packing 16 can be compressed axially by the pressure sleeve 20, which results in an axial and radial sealing effect of the packing 16 to be achieved.

The contact pressure for compressing the packing 16 is provided by a spring element 22, which in the present case is designed as a centered disk spring assembly. In the present case, the spring element 22 radially surrounds the valve rod 12. The spring element 22 is supported on a pretensioning device 24. The pretensioning device 24 has a housing that forms an actuator 26, which is sealingly connected to a control cover 28. A first end of the spring element 22 is supported on the control cover 28, which has a first stop 40 formed on it. The respective other end of the spring element 22 is supported on a second stop 32, which is formed by the actuator 26, with the interposition of a pressure element 30, which is designed as a pressure plate or a compression flange in the present case.

The spring element 22 is axially pretensioned between the first stop 40 and the second stop 32 in the preassembled state of the pretensioning device 24, in particular when the installation space is small, so that it already generates a pretensioning force in the idle state, i.e. before it exerts a contact pressure on the pressure sleeve 20. In the present case, the spring element 22 is installed in the control valve unit 10 in a pretensioned state.

For mounting the pretensioning device 24 in the control valve unit 10, the actuator 26 has an adjusting thread 34 formed on an inner side thereof, which thread 34 is made to engage with an external thread 36 of the valve housing 14. By tightening the actuator 26, the adjusting thread 34 is screwed into the external thread 36 until a screw-in point with a noticeable resistance is reached. At this screw-in point of the pretensioning device 24 in the valve housing 14, the pressure sleeve 20 is in direct contact with the packing 16 without any contact pressure, with the pressure element 30 in the present case bearing against the pressure sleeve 20 via a projection 38. At this screw-in point, the spring element 22 is clamped between the first stop 40 and the second stop 32 without exerting any axial contact pressure on the compression sleeve 20 or the packing 16. The pretensioning device 24 or the second stop 32 is in the present case in an initial position, which can be defined, for example, as a zero position for measuring a change in position of the compression sleeve 20 due to the settling properties of the packing 16.

In the present case, a circumferential mounting ring 42 is arranged on one end of the pressure sleeve 20 that protrudes from the pretensioning device 24. On its end face, the mounting ring 42 includes a fastening ring 44 made of magnetically conductive material. A cylindrical magnet 46 adheres to the fastening ring 44 by means of magnetic force. The magnet 46 is accommodated in a guide groove 48, in which it can move axially in a sliding manner with virtually no friction or play. As a result, it can always be entrained in the guide groove 48 during an axial change in position or a movement of the pressure sleeve 20.

The guide groove 48 is formed by a sensor housing 50 of a measuring device 52, which is connected to the pretensioning device 24 and is supplied with power via a cable connection 58. The cable connection 58 can also be used, for example, to transmit data, particularly to other components of the control valve unit. In the present case, the sensor housing 50 is firmly connected to the control cover 28 of the pretensioning device 24. It is conceivable for the measuring device 52 and the pretensioning device 24 to constitute a pre-assembled unit, for example.

A magnet-sensitive sensor 54 is arranged in the sensor housing 50, which detects the axial movement of the magnet 46 without contact. The sensor 54 can be designed in particular as an xMR chip or a Hall effect sensor. The sensor housing 50 enables a narrow, fixed distance to be maintained between the magnet 46 and the sensor 54 in a radial direction of the pretensioning device 24 in order to reliably detect an axial displacement measurement or a position of the magnet 46. In the present case, the magnet 46 is in its axially lowest position relative to the sensor 54 or in an area of an optimum lower range value of the sensor 54.

The sensor 54 communicates bidirectionally with a control unit (not shown here) whose evaluation electronics process the measurement data received from the sensor 54. In particular, the control unit and the sensor 54 can be integrated together on one chip. The control unit communicates with an operating unit 56 of the measuring device 52 (also not shown here). The control unit 56 has a calibration button with which the sensor 54 can be zeroed, for example in the initial position of the pretensioning device 24 described above. The magnet 46 is in a certain position relative to the sensor 54. The calibration enables the sensor 54 to monitor a relative movement of the magnet 46, and consequently a relative axial movement of the pressure sleeve 20, with the evaluated measurement data being displayed on a display unit of the operating unit 56.

Figure 2:
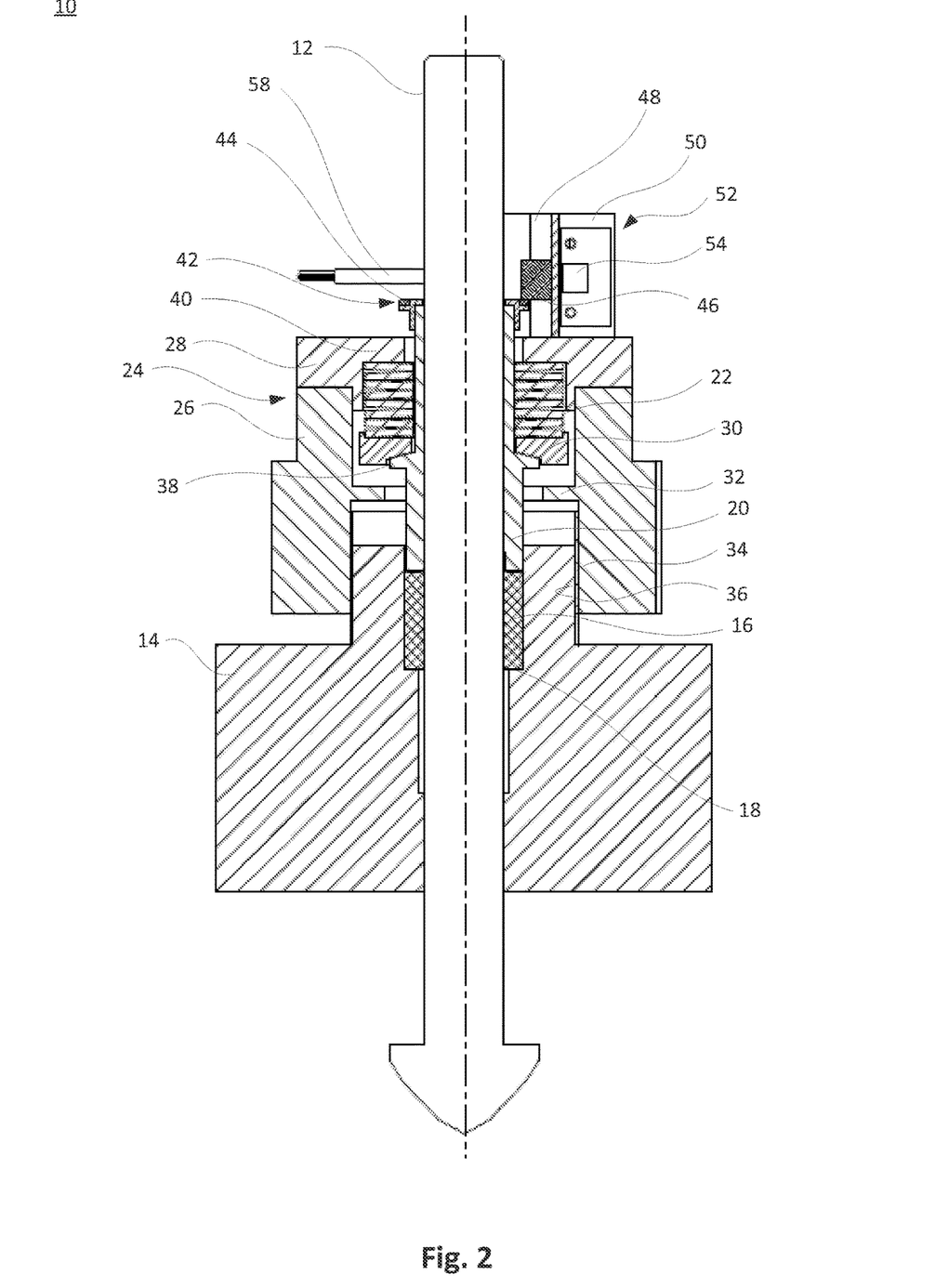
FIG. 2 is a detail of a sectional view of a control valve unit according to the invention with a pre-tensioning device, in an operating state of the control valve unit.

In FIG. 2, the seal assembly of the control valve unit 10 is shown in an operating state of the control valve unit 10, i.e. in the braced state of the packing 16. The pretensioning device 24 can be used to set an axial spring tension on the packing 16. Starting from the zero position illustrated, for example, in FIG. 1, the actuator 26 is screwed further into the valve housing 14 by 6 to 7 rotations. This causes the first stop 40 and the second stop 32 to move towards the counter bearing 18. As a result, the second stop 32 is spaced at an axial distance from the pressure element 30 compared to the initial position described above with respect to FIG. 1, and the spring element 22 is further compressed between the control cover 28 and the pressure element 30, which causes an increase in the pretensioning force of the spring element 22 and consequently in a contact pressure force on the pressure sleeve 20 and on the packing 16. The axial movement of the pretensioning device 24 in the direction of the counter-bearing 18 also results in the pressure sleeve 20 protruding from the control cover 28 of the pretensioning device 24, and in the magnet 46, which is entrained by the pressure sleeve 20, moving relative to the sensor 54. Compared to the view of FIG. 1, the present view shows the pretensioning device 24 screwed into the valve housing 14 by several rotations of the actuator 26, which causes the magnet 46 to be arranged directly opposite the sensor 54 at the same axial height.

The sensor 54 can be used in combination with a force-displacement characteristic for the spring element 22 to precisely set the contact pressure with which the spring element 22 should act on the packing 16. The force-displacement characteristic is stored in a memory of the control unit, for example, and the sensor 54 is already calibrated as a force sensor before the pretensioning device is fitted. The spring element 22 is pretensioned in the pretensioning device 24 to a desired pretensioning force before installation in the control valve unit 10, which pretensioning force can be read off, for example, via the operating unit 56 (not shown here). An axial change in the contact pressure of the spring element 22 can be determined via the relative axial displacement of the magnet 46 from the zero position described above as an example. This allows the actuator 26 to be screwed into the valve housing 14 up to a predefined value of the sensor 54, i.e. up to a specific pretensioning force that corresponds to a specific axial change in position of the magnet 46. The axial distance over which the magnet 46 moves relative to the sensor 54 corresponds to a compression of the spring element 22, and thus to a specific change in the pretensioning force with which the spring element 22 now acts on the packing 16 after the second stop 32 has been arranged axially spaced from the compression flange 30 by rotating the actuator 26 in the direction of the counter bearing 18. The force-displacement characteristic curve can be used to precisely set a predefined axial contact pressure of the spring element 22 against the packing 16 in order to apply a contact pressure that is adapted to the operating conditions on packings 16 manufactured in different ways and having different lengths.

It is conceivable for the measuring device 52 to have a regular battery or a rechargeable battery in addition to the cable connection 58. This has the advantage that the sensor 54 and the control unit 56 are also supplied with power before the entire control valve unit 10 is put into operation. This makes it possible to display the contact pressure acting on the packing 16 on the display unit during assembly of the pretensioning device 24 in the control valve unit 10 before putting the control valve unit 10 into operation.

As the control valve unit 10 is being put into operation, the spring-biased pressure sleeve 20 exhibits an axial movement relative to the second stop 32 due to the wear and/or settling properties of the packing 16. This movement is proportional to a setting path of the packing 16 and indicates the state of wear of the packing 16. When the pressure sleeve 20 moves axially, it always entrains the magnet 46. Consequently, the axial movement of the magnet 46 relative to the sensor 54 corresponds to the movement of the pressure sleeve 20 relative to the second stop 32. During operation, a sensor value corresponding to a position of the pressure sleeve 20 can now be read from the display unit at any time. This allows the setting process of the package 16 to be measured and monitored over time. The pretensioning force with which the spring element 22 acts on the packing 16 and its change over time can be derived from the force-displacement characteristic of the spring element 22. This pretensioning force can also be displayed and monitored.

The pressure sleeve 20 yields to the contact pressure of the spring element 22 until the pressure element 30 rests against the second stop 32. The second stop 32 limits the deflection of the pretensioned spring element 22 and thus the axial change in position of the pressure sleeve 20. In this way, a spring elongation of the spring element 22 and thus a change in position of the pressure sleeve 20 can be limited via the second stop 32 in order to prevent the tightness of the packing 16 from decreasing and process fluid from escaping.

For example, an alarm can be triggered if a critical setting value of the packing 16 is exceeded and/or if a predefined pretensioning force is exceeded and/or not reached. Depending on the nature and/or design of the packing 16, either its service life is exhausted and it must be replaced, or it needs to be retightened. During the tightening process, the contact pressure acting on the package 16 can be displayed and monitored via the control unit 56, so that the actuator 26 is tightened according to the desired contact pressure. It is possible, for example, to automatically tighten the pretensioning device 24 to the desired contact pressure by means of an actor (not shown here) acting on the actuator 26.

Figure 3:
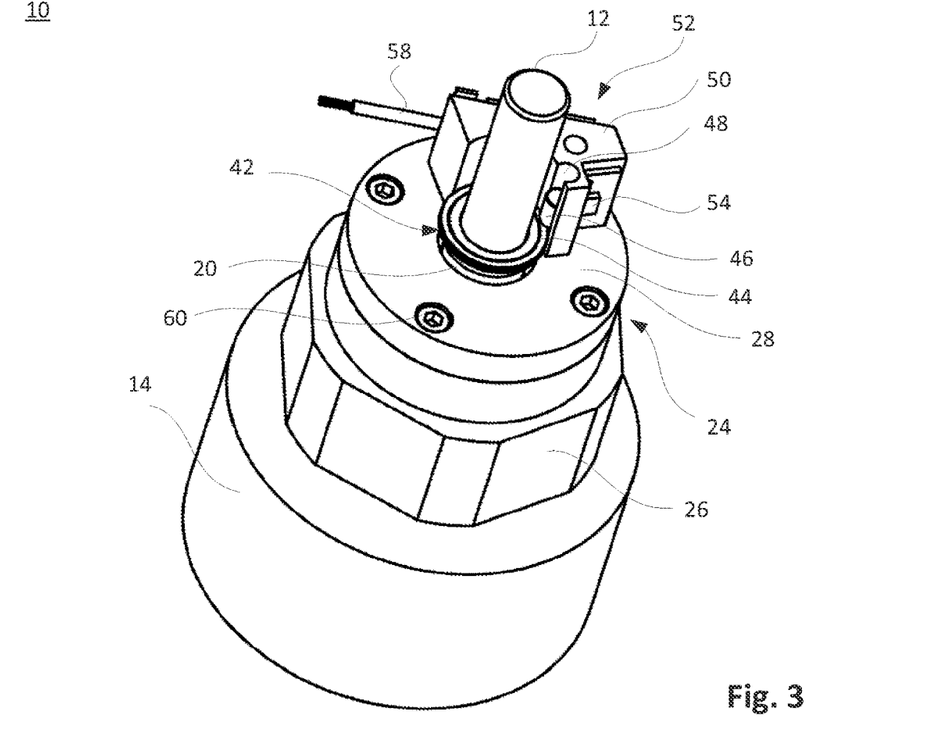
FIG. 3 is a perspective view, taken at an angle from above, of a pretensioning device of a control valve unit according to the invention.

FIG. 3 is a perspective view, taken at an angle from above, of a pretensioning device 24 of a control valve unit 10 according to the invention as shown in FIG. 1. The pretensioning device 24 radially encloses the spring-loaded pressure sleeve 20 with the control cover 28 and the adjusting body 26. The control cover 28 is detachably connected to the actuator 26 by means of screw connections 60. The spring element 22 (not shown here) is clamped between the first stop 40 of the control cover 28 and the second stop 32 of the actuator 26 in the pretensioning device 24 under axial pretension.

The actuator 26 is connected to the valve housing 14 via the internal adjusting thread 34 (not shown here). To adjust the pretensioning device 24, the actuator 26 is designed to have a lateral surface that has a drive profile for an open-end wrench. It is also conceivable for the lateral surface to have a profile for another tool, for example for a nose hook wrench. The predefined pretensioning force with which the spring element 22 is to act on the packing 16 when the pretensioning device 24 is mounted can be set via a defined number of rotations of the actuator 26 relative to the valve housing 14.

The mounting ring 42 is arranged at the free end of the pressure sleeve 20, which extends out of the pretensioning device 24, via which the fastening ring 44, which is ferromagnetic in particular, is arranged on the end face of the pressure sleeve 20. The fastening ring 44 radially surrounds the valve rod 12. The magnet 46 of the measuring device 52 is magnetically connected to the fastening ring 44 and is guided in the guide groove 48 formed by the sensor housing 50 so that it can move axially and cannot fall out.

In the present case, the magnet 46 has a cylindrical shape and is arranged almost free of play in the guide groove 48, with the sensor housing 50 having a complementary shape to the magnet 46 in the area of the guide groove 48 and partially embracing it radially. The guide groove 48 extending in the axial direction is arranged directly on one circumferential side of the mounting ring 42 on the fastening ring 44. The fastening ring 44 partially extends radially into the guide groove 48. In this way, the pressure sleeve 20 always entrains the magnet 46 during an axial movement caused by wear of the packing 16.

The axial movement of the pressure sleeve 20 can be determined by the movement of the magnet 46 relative to the sensor 54. In order to reliably detect an axial displacement measurement of the magnet 46, the sensor 54 is arranged in a fixed position in the sensor housing 50 of the measuring device 52 at a radially fixed distance from the magnet 46.

Figure 4:
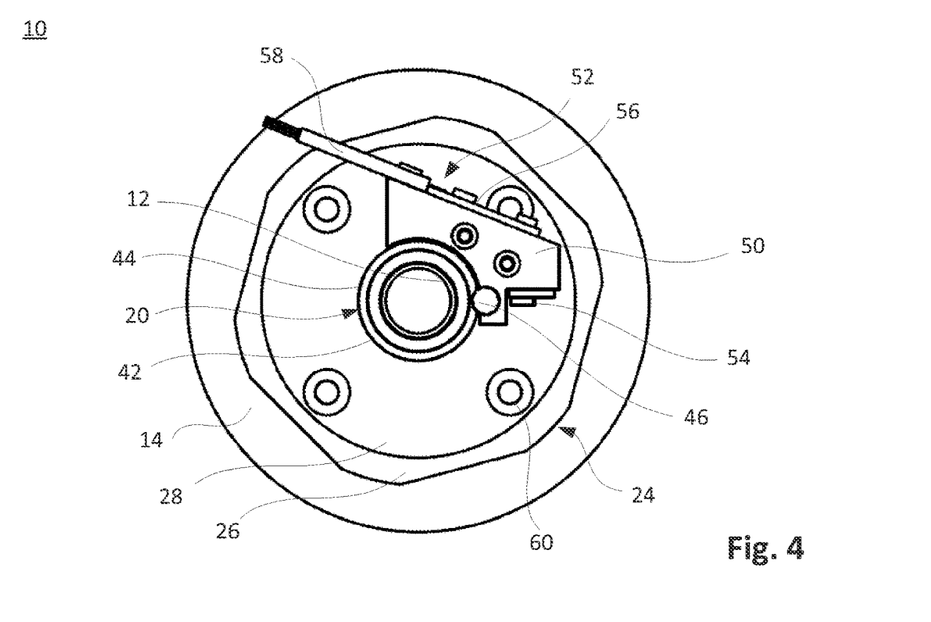
FIG. 4 is a top view of a pretensioning device of a control valve unit according to the invention.

FIG. 4 is a top view of a pretensioning device 24 of a control valve unit 10 according to the invention as shown in FIG. 3. In the present embodiment, the measuring device 52 is designed as an assembly unit with the pretensioning device 24. When tightening and retightening the packing 16, the pretensioning device 24 is rotated via the actuator 26. The sensor housing 50 surrounds the magnet 46 beyond an equator of the magnet 46. The magnet 46 is arranged to rotate relative to the fastening ring 44 in the circumferential direction of the valve rod 12, i.e. when the actuator 26 rotates, the magnet 46 rotates around the valve rod 12 while adhering to the fastening ring 44. The magnet 46 remains in the same radial position relative to the sensor 54 via the sensor housing 50, which is firmly connected to the control cover 28, despite the rotation of the pretensioning device 24 relative to the valve housing 14. The measuring device 52, i.e. the sensor housing 50, the sensor 54, the magnet 46 and the cable connection 58, is connected to the control cover 28 in a fixed position and rotates as a unit around the valve rod 12 when the actuator 26 is being rotated.

An operating unit 56 is arranged on the sensor housing 50. It comprises a display unit for displaying the setting process and/or the contact pressure acting on the packing 16. It is conceivable for the operating unit 56 to be designed, for example, as a mobile terminal device that communicates wirelessly with the control unit, for example.

LIST OF REFERENCE SIGNS

- 10 control valve unit
- 12 valve rod
- 14 valve housing
- 16 packing
- 18 counter bearing
- 20 pressure sleeve
- 22 spring element
- 24 pretensioning device
- 26 actuator
- 28 control cover
- 30 pressure element
- 32 second stop
- 34 adjusting thread
- 36 external thread
- 38 protrusion
- 40 first stop
- 42 mounting ring
- 44 fastening ring
- 46 magnet
- 48 guide groove
- 50 sensor housing
- 52 measuring system
- 54 sensor
- 56 operating unit
- 58 cable connection
- 60 screw connection

The invention claimed is:

1. A control valve unit comprising a valve rod which is sealed from a valve housing via a seal assembly, the seal assembly having a packing, which is received axially between a pressure sleeve and a counter bearing on the valve housing, which pressure sleeve is movably mounted in the axial direction relative to the valve housing and transmits a pressing force, which is applied to the pressure sleeve by a spring element via a pressure element, to the packing, and which spring element is supported on a pretensioning device, the distance of which to the counter bearing can be adjusted, whereby the pressing force of the spring element acting on the pressure sleeve can be adjusted, characterized in that the spring element is arranged axially between a first stop and a second stop of the pretensioning device, wherein, in a preinstalled state of the pretensioning device, the spring element is supported on the first stop and on the second stop under pretension, wherein, in an operating state of the control valve unit, the second stop is arranged at a fixed distance to the first stop in the direction of the counter bearing and wherein the change in the axial position of the pressure sleeve is limited by the second stop which is arranged at a distance to the pressure element in the direction of the counter bearing.

2. The control valve unit according to claim 1, wherein the pressure element is designed as a compression flange.

3. The control valve unit according to claim 1, wherein the pretensioning device has a housing which comprises a control cover which provides the first stop and which is connected to an actuator that provides the second stop.

4. The control valve unit according to claim 3, wherein the actuator has an internal adjusting thread which, in an assembled state of the control valve unit, is in engagement with an external thread of the valve housing.

5. The control valve unit according to claim 1, wherein the pretensioning device is connected to a measuring device which comprises a measuring element for detecting the change in axial position of the pressure sleeve.

6. The control valve unit according to claim 5, wherein the measuring element is designed as a magnetically sensitive sensor which interacts with a magnet that is connected to the pressure sleeve.

7. The control valve unit according to claim 6, wherein the measuring device has a sensor housing for accommodating the sensor, which sensor housing has a guide groove formed therein in which the magnet is guided for axial movement, and which the magnet is connected to the pressure sleeve via a magnetically conductive fastening ring which engages at least partially radially in the guide groove.

8. The control valve unit according to claim 7, wherein the magnet is arranged so as to be rotatable relative to the fastening ring in the circumferential direction of the valve rod.

9. The control valve unit according to claim 1, wherein the measuring element communicates bidirectionally with a control unit which is communicatively connected to an operating unit of the measuring device, which operating unit has at least one display unit and a calibration button.

10. The control valve unit according to claim 9, wherein the control unit detects a contact pressure of the packing via a force-displacement characteristic of the spring element.

11. The control valve unit according to claim 9, wherein the control unit is communicatively connected to at least one actor which is connected to the actuator for readjusting the pretensioning force.

\* \* \* \* \*